(12) United States Patent
Finkenzeller et al.

(10) Patent No.: US 12,003,182 B2
(45) Date of Patent: Jun. 4, 2024

(54) DC-TO-DC CONVERTER HAVING A SECONDARY RESONANT CIRCUIT CAPACITOR, AND METHOD FOR OPERATING A DC-TO-DC CONVERTER

(71) Applicant: Siemens Energy Global GmbH & Co. KG, Bayern (DE)

(72) Inventors: Michael Finkenzeller, Feldkirchen-Westerham (DE); Mirjam Mantel, Haar (DE); Monika Poebl, Munich (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 324 days.

(21) Appl. No.: 17/439,698

(22) PCT Filed: Feb. 17, 2020

(86) PCT No.: PCT/EP2020/054036
§ 371 (c)(1),
(2) Date: Sep. 15, 2021

(87) PCT Pub. No.: WO2020/187513
PCT Pub. Date: Sep. 24, 2020

(65) Prior Publication Data
US 2022/0166328 A1    May 26, 2022

(30) Foreign Application Priority Data

Mar. 21, 2019 (EP) ..................... 19164288

(51) Int. Cl.
*H02M 3/335* (2006.01)
*H02M 1/00* (2006.01)
*H02M 3/00* (2006.01)

(52) U.S. Cl.
CPC ..... *H02M 3/33584* (2013.01); *H02M 1/0058* (2021.05); *H02M 3/01* (2021.05); *H02M 3/33573* (2021.05)

(58) Field of Classification Search
CPC .................. H02M 3/335–42; H02M 3/01
See application file for complete search history.

(56) References Cited

U.S. PATENT DOCUMENTS

2005/0286270 A1    12/2005   Petkov
2015/0381064 A1    12/2015   Matsubara et al.
(Continued)

FOREIGN PATENT DOCUMENTS

CN    102064707 A    5/2011
CN    103762846 A    4/2014
(Continued)

OTHER PUBLICATIONS

Liu, Xinhe et al.; "Design Scheme for 10 kVMW Level Power Electronic Transformer"; Journal of North China Electric Power University; May 2017; pp. 59-66; vol. 44, No. 3; English abstract on p. 1.
(Continued)

*Primary Examiner* — Peter M Novak
(74) *Attorney, Agent, or Firm* — Wolter Van Dyke Davis, PLLC

(57) ABSTRACT

A DC-to-DC converter includes a primary side of a transformer element of the DC-to-DC converter and a secondary side of the transformer element, the primary side having a first rectifier circuit and a primary-side resonant circuit and the secondary side having a second rectifier circuit and a secondary-side stored energy source, the transformer element being arranged between the primary side and the
(Continued)

secondary side in order to transfer electrical energy, the secondary side having a secondary resonant circuit capacitor.

6 Claims, 1 Drawing Sheet

(56) References Cited

U.S. PATENT DOCUMENTS

2017/0054378 A1    2/2017  Njiende T.
2018/0366267 A1*  12/2018  Raimann ............... H01F 27/38
2019/0288607 A1*   9/2019  Zong ................. H02M 3/33584

FOREIGN PATENT DOCUMENTS

| CN | 104184323 | A  | 12/2014 |
| CN | 106057433 | A  | 10/2016 |
| CN | 106208419 | A  | 12/2016 |
| CN | 106936320 | A  | 7/2017  |
| CN | 108511148 | A  | 9/2018  |
| EP | 2597766   | A2 | 5/2013  |

OTHER PUBLICATIONS

Noah M et al: "Winding orientation method to minimise the secondary leakage of a gapped transformer utilised in LLC resonant converter"; Electronics Letters; IEE Stevenage; GB; vol. 54; No. 3; Feb. 8, 2018; pp. 157-159; XP006075527; ISSN: 0013-5194; DOI: 10.1049/EL.2017.4013; 2018.

International search report and written opinion dated Mar. 20, 2020, for corresponding PCT/EP2020/054036.

* cited by examiner

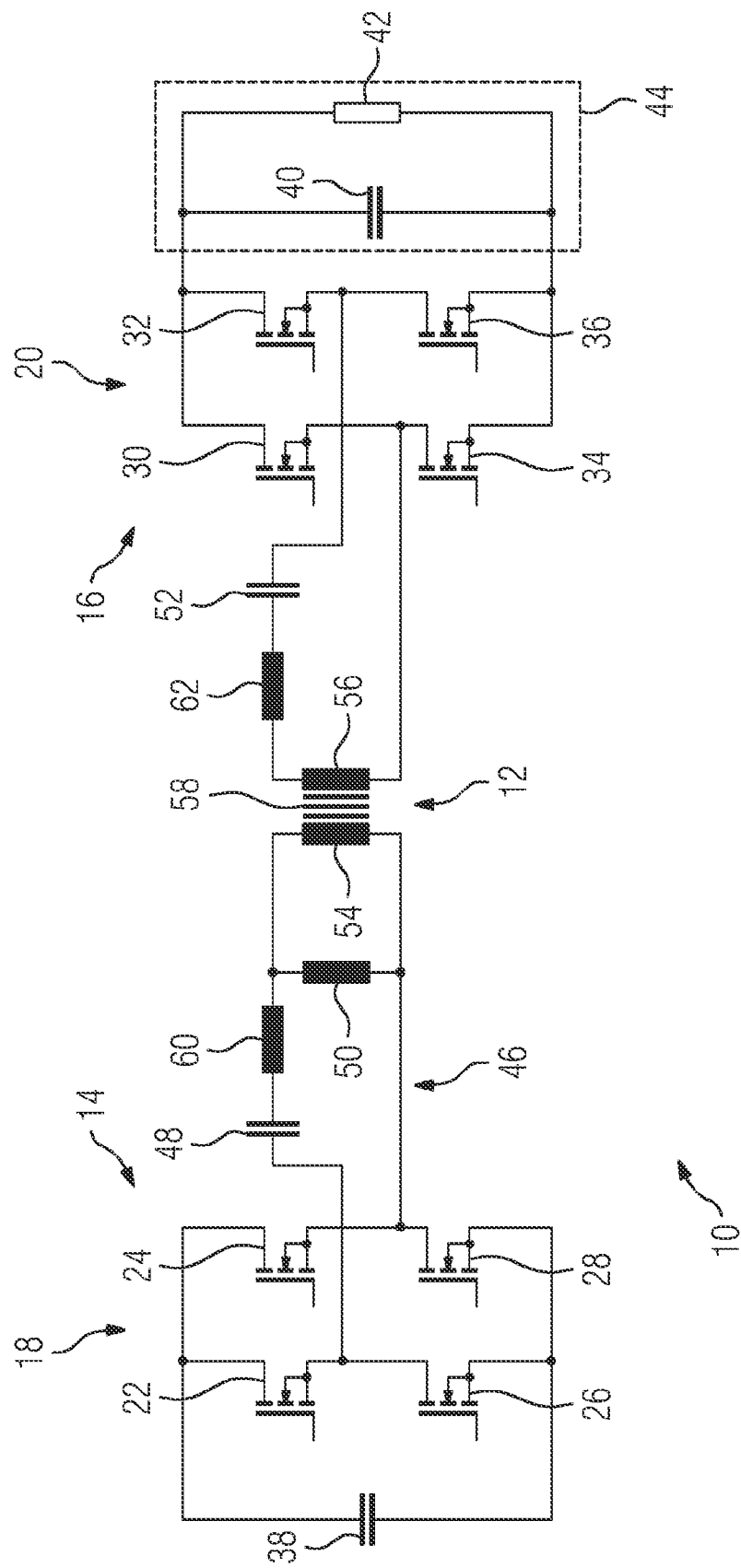

DC-TO-DC CONVERTER HAVING A SECONDARY RESONANT CIRCUIT CAPACITOR, AND METHOD FOR OPERATING A DC-TO-DC CONVERTER

CROSS REFERENCE TO RELATED APPLICATIONS

This application is the US National Stage of International Application No. PCT/EP2020/054036 filed 17 Feb. 2020, and claims the benefit thereof. The International Application claims the benefit of European Application No. EP19164288 filed 21 Mar. 2019. All of the applications are incorporated by reference herein in their entirety.

FIELD OF INVENTION

The invention relates to a DC-DC voltage converter having a primary side of a transformer element of the DC-DC voltage converter and having a secondary side of the transformer element. A first rectifier circuit and a primary-side resonant circuit are formed on the primary side and a second rectifier circuit and a secondary-side energy store are formed on the secondary side. The transformer element is arranged between the primary side and the secondary side in order to transmit electrical energy. The invention furthermore relates to a method for operating a DC-DC voltage converter.

BACKGROUND OF INVENTION

DC-DC voltage converters, which are also referred to as DC-to-DC converters, operated in fully resonant mode consist of a resonant circuit, a transformer element and a half-bridge or full-bridge circuit that excites the resonant circuit. In order to be able to maintain zero-voltage switching, so-called ZVS operation, at all relevant operating points, passive components are also necessary. However, these DC-DC voltage converters from the prior art are only designed in fully resonant mode for unidirectional operation, that is to say in particular for transmitting energy from the primary side to the secondary side.

Furthermore, numerous publications on the bidirectional dual-active bridge are known. These DC-DC voltage converters are often built with hard switching, that is to say with switching losses. However, since the phase angle between the primary-side and secondary-side full bridge has to be regulated in the case of the dual-active bridge, it is more difficult to accommodate series resonant elements.

EP 2 597 766 A2 discloses a bidirectional resonant converter having a primary side and a secondary side and a transformer that connects the primary and secondary sides and has a primary inductance and a secondary inductance. With the aim of ensuring reliable and low-loss energy transmission between the primary and secondary sides, a primary resonant network connected to the primary inductance on the primary side or resonantly incorporating the primary inductance and at least one secondary resonant network connected to the at least one secondary inductance on the secondary side or resonantly incorporating the secondary inductance are provided.

According to US 2015/0381064 A1, a bidirectional DC-DC voltage converter contains a first and a second control circuit and a first and a second bridge circuit, which are each connected to a first and a second DC voltage supply. In one embodiment variant, when the power is supplied from the first DC power supply to the second DC power supply, the first control circuit performs PFM control of the first bridge circuit at a frequency that is equal to or lower than the resonant frequency of an LC resonant circuit according to a control variable based on the voltage and the current of the second DC power supply. When the power is supplied in the other direction, the second control circuit performs fixed frequency control of the second bridge circuit using phase shift control or the like according to a control value based on the voltage and the current of the first DC power supply.

CN 102 064 707 A discloses an input-parallel and output-parallel combination converter under the control of a common phase shift angle. A main circuit comprises more than two phase shifting circuits under the control of the common phase shifting angle; each phase shifting circuit consists of a transformer with leakage inductance and two bridge circuits connected by the transformer and the input ends of all phase shifting circuits are connected in parallel and the output ends of all phase shifting circuits are connected in parallel.

CN 104 184 323 A discloses a bidirectional DC-DC converter circuit. The bidirectional DC-DC converter circuit comprises a high-frequency transformer and a first square-wave generator and a second square-wave generator, which are arranged on the primary side and the secondary side of the high-frequency transformer, respectively. The bidirectional DC-DC converter circuit further comprises a first resonant network circuit, which is connected between the first square-wave generator and a primary winding of the high-frequency transformer, and a second resonant network circuit, which is connected between the second square-wave generator and a secondary winding of the second square-wave generator. The resonant frequency provided by the first network circuit is the same as the resonant frequency provided by the second network circuit.

SUMMARY OF INVENTION

The object of the present invention is to provide a DC-DC voltage converter and a method by means of which a fully resonant DC-DC voltage converter can be provided for both transmission directions.

This object is achieved by a DC-DC voltage converter and by a method for operating a DC-DC voltage converter according to the independent patent claims. Advantageous embodiments are specified in the dependent claims.

One aspect of the invention relates to a DC-DC voltage converter having a primary side of a transformer element of the DC-DC voltage converter and having a secondary side of the transformer element. The primary side has a first rectifier circuit and a primary-side resonant circuit and the secondary side has a second rectifier circuit and a secondary-side energy store. The transformer element is arranged between the primary side and the secondary side in order to transmit electrical energy.

Provision is made for the secondary side to have a secondary resonant circuit capacitor.

By inserting the additional capacitance, that is to say the secondary resonant circuit capacitor, on the secondary side of the transformer element, a fully resonant system is also provided on this side, with the result that electrical energy can be exchanged for both transmission directions. A bidirectional DC-DC voltage converter can thus be provided.

Using an inductor combination avoids having to use additional inductances for bidirectional operation. By choosing a new winding configuration combined with a large air gap within the transformer element, the high series inductance necessary for the topology in the form of a high degree of leakage and also the parallel inductance which is lower for ZVS operation close to no-load operation can be integrated into one component. In particular, this is an inductor combination with potential separation for the DC-DC voltage converter.

In particular, the use of the inductor combination and the additional insertion of the secondary resonant circuit capacitor on the secondary side of the transformer element can form a bidirectional transmission system.

For example, the DC-DC voltage converter can be used as an electrical energy store for bidirectional charging and discharging of a motor vehicle battery. The motor vehicle battery thus forms the electrical energy store. By means of induction by way of the transformer element, the motor vehicle battery can be charged, for example, from the public grid, which is formed on the primary side. If the motor vehicle battery is only intended to give back electrical energy to the public grid, for example as a buffer store for the public grid, the DC-DC voltage converter according to the invention can be used both for charging and for discharging the motor vehicle battery. For example, in what are known as decentralized energy supply systems, for example for smart grids, the motor vehicle battery can thus be used as an energy store for the smart grid.

According to one advantageous embodiment, the second rectifier circuit is designed as an electrical full bridge. In particular, the first rectifier circuit is also designed as an electrical full bridge. In other words, provision is made for the rectifier circuit to involve active components. Depending on the direction of power flow, the full bridge on the input side excites the resonant circuit—the variable switching frequency sets the required output voltage, the full bridge on the output side operates as an active rectifier. For example, the respective full bridge can have corresponding semiconductor switches, for example MOSFETs. These semiconductor switches can be controlled for example by means of an electronic computing device in such a way that they switch on or block electrical energy. This makes it possible to form a fully resonant bidirectional transmission system with the active rectification on the secondary side.

In a further advantageous embodiment, a primary-side number of windings of the transformer element is designed to be equal to a secondary-side number of windings of the transformer element. In other words, in this embodiment, the transformer element has just as many windings on the primary side as on the secondary side. In other words, a transmission ratio of 1:1 is provided. This makes it possible for similar input and output voltage ranges and similar ranges of the switching frequency to be able to be achieved by means of the DC-DC voltage converter.

It is also advantageous if a primary leakage inductance with a first inductance value is arranged on the primary side and a secondary leakage inductance with a second inductance value is arranged on the secondary side, wherein the first inductance value and the second inductance value are the same. In other words, a primary-side leakage inductance is equal to a secondary-side leakage inductance. The coupling then expediently lies in a range from 60 percent to 80 percent. In particular, this makes it possible for similar input and output voltage ranges and similar ranges of the switching frequency to be able to be achieved by means of the DC-DC voltage converter.

Furthermore, it has proven to be advantageous if a first capacitor value of a primary resonant circuit capacitor of the primary-side resonant circuit is equal to a second capacitor value of the secondary resonant circuit capacitor. This makes it possible in particular for similar input and output voltage ranges and ranges of the switching frequency of the full bridges to be able to be achieved.

In a further advantageous embodiment, a primary-side number of windings of the transformer element is designed to not be equal to a secondary-side number of windings of the transformer element. This makes it possible for different input and output voltage ranges and ranges of the switching frequency of the full bridges to be able to be achieved. In other words, the transformation ratio of the transformer element is not equal to 1:1. This can be particularly useful if the secondary-side DC voltage range differs significantly from the primary-side DC voltage range.

In a further advantageous embodiment, a second capacitor value of the secondary resonant circuit capacitor is formed as the product of a first capacitor value of a first resonant circuit capacitor of the resonant circuit and a quotient of a primary leakage inductance of the primary side and a second leakage inductance of the secondary side. In order then to obtain similar switching frequency ranges for the rectifier circuits, for example in the event of an unequal transformation ratio of the transformer element, the following:

$$C2_{sec} = C1_{prim} \cdot Lsig_{prim} / Lsig_{sec}:$$

is selected. $C2_{sec}$ corresponds in this case to the secondary resonant circuit capacitor, $C1_{prim}$ to the first resonant circuit capacitor, $Lsig_{prim}$ to the primary leakage inductance and $Lsig_{sec}$ to the second leakage inductance. Alternatively, other values are also possible for $C2_{sec}$. In particular, similar switching frequency ranges of the two rectifier circuits, in particular of the two full bridges, can thus be formed.

It is also advantageous if at least the secondary resonant circuit capacitor is designed as a series capacitor. In particular, the first resonant circuit capacitor is also designed as a series capacitor. As a result, the bidirectional operation of the DC-DC voltage converter can be implemented in a simple and yet reliable manner.

It is likewise advantageous if at least the secondary resonant circuit capacitor is designed as a parallel capacitor. In particular, the primary resonant circuit capacitor can also be designed as a parallel capacitor. The bidirectional operation and the character of the resonant converter, which sets the output voltage by varying the switching frequency of the rectifier circuits on the input side, in particular the full bridge, is retained in this case. It is thus possible in different ways to be able to implement the bidirectional operation of the DC-DC voltage converter.

According to a further advantageous embodiment, a series inductance is connected in addition to the secondary resonant circuit capacitor. This makes it possible for the bidirectional resonant converter operation of the DC-DC voltage converter to also be able to be implemented with a conventional transformer element. In particular, a series inductance, in other words a series choke, is then connected in addition to the newly introduced secondary resonant circuit capacitor and in particular also the secondary-side full bridge. In this way, bidirectional operation of the DC-DC voltage converter can also be implemented in the case of a standard transformer element, that is to say in particular in the absence of an inductor combination.

A further aspect of the invention relates to a method for operating a DC-DC voltage converter having a primary side of a transformer element of the DC-DC voltage converter and having a secondary side of the transformer element. The primary side is provided with a first rectifier circuit and a primary-side resonant circuit and the secondary side is provided with a second rectifier circuit and a secondary-side energy store. Electrical energy is transmitted between the primary side and the secondary side.

Provision is made for electrical energy to be transmitted bidirectionally from the primary side to the secondary side or from the secondary side to the primary side by means of a secondary resonant circuit capacitor on the secondary side.

In other words, bidirectional operation of the DC-DC voltage converter can be carried out in the method.

Advantageous embodiments of the DC-DC voltage converter are to be regarded as advantageous embodiments of the method. For this purpose, the DC-DC voltage converter has objective features in order to enable the method or an advantageous embodiment thereof to be carried out. The method is carried out in particular by means of the DC-DC voltage converter.

Further features of the invention become apparent from the claims, the figures and the description of the FIGURES. The features and combinations of features cited above in the description and the features and combinations of features cited below in the description of the figures and/or shown on their own in the figures are able to be used not just in the respectively specified combination but also in other combinations, without departing from the scope of the invention.

BRIEF DESCRIPTION OF THE DRAWINGS

The invention is now explained in more detail on the basis of an exemplary embodiment and with reference to the appended drawing, in which:

the single FIGURE shows a schematic equivalent circuit diagram of an embodiment of a DC-DC voltage converter.

DETAILED DESCRIPTION OF INVENTION

The FIGURE shows a schematic equivalent circuit diagram of an embodiment of a DC-DC voltage converter 10. The DC-DC voltage converter 10 has transformer elements 12. The transformer element 12 has a primary side 14 and a secondary side 16. A first rectifier circuit 18, which is designed in particular as an electrical full bridge, is formed on the primary side 14. A second rectifier circuit 20, which is designed in particular as an electrical full bridge, is formed on the secondary side 16. In the present exemplary embodiment, the first rectifier circuit 18 has four active components, in particular four MOSFETs 22 to 28, the first rectifier circuit 18 being formed by a first MOSFET 22, a second MOSFET 24, a third MOSFET 26 and a fourth MOSFET 28.

The second rectifier circuit 20 also has four MOSFETs 30 to 36, the second rectifier circuit 20 being formed by a fifth MOSFET 30, a sixth MOSFET 32, a seventh MOSFET 34 and an eighth MOSFET 36.

In particular, the primary side 14 has an intermediate circuit capacitance 38, which is coupled in particular to an energy storage network, which is not illustrated. Furthermore, a battery capacitance 40 and a battery resistance 42 are illustrated on the secondary side. Overall, a secondary-side energy store 44 can be provided by means of the battery capacitance 40 and the battery resistance 42.

The primary side 14 also has a primary-side resonant circuit 46. The primary-side resonant circuit 46 is formed in particular by a primary resonant circuit capacitor 48 and a primary resonant circuit inductance 50.

One aspect of the invention relates to the DC-DC voltage converter 10 having the primary side 14 of the transformer element 12 and having the secondary side 16. The primary side 14 has the first rectifier circuit 18. The secondary side 16 has the second rectifier circuit 20. Furthermore, the secondary side has the secondary-side energy store 44. The transformer element 12 is arranged between the primary side 14 and the secondary side 16 in order to transmit electrical energy.

Provision is made for the secondary side 16 to have a secondary resonant circuit capacitor 52.

In particular, the inductances according to the prior art are no longer required as a result. In particular, the DC-DC voltage converter 10 is provided as an inductor combination with potential separation for the DC-DC voltage converter 10. By choosing a new winding configuration in the transformer element 12 combined with a large air gap 58, the high series inductances necessary for the topology in the form of a high degree of leakage and also the parallel inductance which is low for ZVS operation close to no-load operation can be integrated into one component, namely the inductor combination. The combination with the secondary resonant circuit capacitor 52 also produces a fully resonant system on the secondary side 16 for bidirectional transmission of electrical energy.

In particular, in the method for operating the DC-DC voltage converter 10 having the primary side 14 of the transformer element 12 and having the secondary side 16 of the transformer element 12, the primary side is provided with the first rectifier circuit 18 and the primary-side resonant circuit 46. The secondary side 16 is provided with the second rectifier circuit 20 and with the secondary-side energy store 44. Electrical energy is transmitted between the primary side 14 and the secondary side 16.

Provision is made for electrical energy to be transmitted bidirectionally from the primary side 14 to the secondary side 16 or from the secondary side 16 to the primary side 14 by means of the secondary resonant circuit capacitor 52 on the secondary side 16.

In particular, provision is made for the second rectifier circuit 20 to be designed as an electrical full bridge. Furthermore, a primary-side number of windings 54 of the transformer element 12 can be designed to be equal to a secondary-side number of windings 56 of the transformer element 12.

Provision can furthermore be made for a primary leakage inductance 60 with a first inductance value to be arranged on the primary side 14 and a secondary leakage inductance 62 with a second inductance value to be arranged on the secondary side 16, wherein the first inductance value and the second inductance value are the same.

Provision can furthermore be made for a first capacitor value of the primary resonant circuit capacitor 48 of the primary-side resonant circuit 46 to be equal to a second capacitor value of the secondary resonant circuit capacitor 52.

In particular, in this embodiment, for example the transformer element 12 can have as many windings on the primary side as on the secondary side, that is to say at a transmission ratio of 1:1; the primary leakage inductance 60 is then in particular equal to the secondary leakage inductance 62. The coupling then expediently lies in a range from 60 percent to 80 percent. The natural frequency of the respective side and thus the respective capacitor values of the resonant circuit capacitors 48, 52 can be selected to be the same or to differ in order to realize in the first case similar and in the second case different input and output voltage ranges and ranges of the switching frequency of the full bridges.

In a further embodiment, the transformation ratio of the transformer element 12 can be selected not to be equal to 1:1. This is useful if the secondary-side DC voltage range differs significantly from the primary-side DC voltage range. In other words, the number of windings 54 on the primary side of the transformer element 12 is designed not to be equal to the number of windings 56 on the secondary side of the transformer element 12. In particular, provision can then be made for the second capacitor value of the secondary resonant circuit capacitor 52 to be formed as the capacitor value of the primary resonant circuit capacitor 48 of the primary-side resonant circuit 46 and a quotient of the primary leakage inductance 60 of the primary side 14 and the secondary leakage inductance 62 of the secondary side 16.

Furthermore, provision can be made in particular for the secondary resonant circuit capacitor 52 to be designed as a series capacitor. This is shown in the FIGURE. Alternatively, provision can also be made for the secondary resonant circuit capacitor 52 to be designed as a parallel capacitor.

Furthermore, provision can be made for the primary resonant circuit capacitor 48 to be designed as a series capacitor. The primary resonant circuit capacitor 48 can alternatively be designed as a parallel capacitor. In particular, as a result, the bidirectional operation and the character of the resonant converter, which sets the output voltage by varying the switching frequency of the full bridge on the input side, can be retained in this case.

Furthermore, provision can be made for a series inductance, which is not shown in the present FIGURE, to be connected in addition to the secondary resonant circuit capacitor 52. This makes it possible to build the bidirectional resonant converter, in other words the DC-DC voltage converter 10, with a conventional transformer. For this purpose, in addition to the newly introduced secondary resonant circuit capacitor 52, the series inductance, in particular a series choke, is then required.

Overall, the FIGURE shows a novel structural concept, in which the additional insertion of the secondary resonant circuit capacitor 52 on the secondary side 16 of the transformer element 12 and active rectification on the secondary side 16 can result in a fully resonant bidirectional transmission system.

LIST OF REFERENCE DESIGNATIONS

10 DC-DC voltage converter
12 Transformer element
14 Primary side
16 Secondary side
18 First rectifier circuit
20 Second rectifier circuit
22 First MOSFET
24 Second MOSFET
26 Third MOSFET
28 Fourth MOSFET
30 Fifth MOSFET
32 Sixth MOSFET
34 Seventh MOSFET
36 Eighth MOSFET
38 Intermediate circuit capacitance
40 Battery capacitance
42 Battery resistance
44 Secondary-side energy store
46 Primary-side resonant circuit
48 Primary resonant circuit capacitor
50 Primary resonant circuit inductance
52 Secondary resonant circuit capacitor
54 Number of windings on the primary side
56 Number of windings on the secondary side
58 Air gap
60 Primary leakage inductance
62 Secondary leakage inductance

The invention claimed is:

1. A DC-DC voltage converter comprising:
a primary side of a transformer element of the DC-DC voltage converter, and
a secondary side of the transformer element, wherein a primary-side number of windings of the transformer element is designed to not be equal to a secondary-side number of windings of the transformer element,
wherein the primary side has a first rectifier circuit and a primary-side resonant circuit and the secondary side has a second rectifier circuit and a secondary-side energy store, wherein the primary-side resonant circuit comprises a primary-side resonant circuit capacitor having a first capacitor value, a series primary inductance for leakage, and a parallel inductance,
wherein the transformer element is arranged between the primary side and the secondary side in order to transmit electrical energy,
wherein the secondary side energy store comprises a secondary-side resonant circuit capacitor, having a second capacitor value, and a series secondary inductance for leakage, the second capacitor value formed as a product of the first capacitor value and a quotient of the series primary inductance for leakage and the series secondary inductance for leakage, and
wherein the series primary inductance for leakage and the parallel inductance for ZVS operation are integrated in the transformer element close to no-load operation, such that an inductor combination is formed.

2. The DC-DC voltage converter as claimed in claim 1, wherein the second rectifier circuit is designed as an electrical full bridge.

3. The DC-DC voltage converter as claimed in claim 1, wherein at least the secondary-side resonant circuit capacitor is designed as a series capacitor.

4. The DC-DC voltage converter as claimed in claim 1, wherein at least the secondary-side resonant circuit capacitor is designed as a parallel capacitor.

5. The DC-DC voltage converter as claimed in claim 1, wherein a series inductance is connected in addition to the secondary-side resonant circuit capacitor.

6. A method for operating a DC-DC voltage converter having a primary side of a transformer element of the DC-DC voltage converter and having a secondary side of the transformer element, wherein the primary side is provided with a first rectifier circuit and a primary-side resonant circuit and the secondary side is provided with a second rectifier circuit and a secondary-side energy store, and wherein electrical energy is transmitted between the primary side and the secondary side, the method comprising:
bidirectionally transmitting electrical energy from the primary side to the secondary side or from the secondary side to the primary side by means of a secondary-side resonant circuit capacitor, wherein a primary-side number of windings of the transformer element is designed to not be equal to a secondary-side number of windings of the transformer element,
wherein the primary-side resonant circuit comprises a primary-side resonant circuit capacitor having a first capacitor value, a series primary inductance for leakage and a parallel inductance,
wherein the secondary-side resonant circuit capacitor has a second capacitor value formed as a product of the first capacitor value and a quotient of the series primary inductance for leakage and a series secondary inductance for leakage, and integrating the series primary inductance for leakage and a parallel inductance for ZVS operation in the transformer element close to no-load operation, such that an inductor combination is formed.

* * * * *